(12) United States Patent
Hemkens et al.

(10) Patent No.: US 7,963,476 B2
(45) Date of Patent: Jun. 21, 2011

(54) STACKABLE TIPPET SPOOL

(75) Inventors: Steven M. Hemkens, Arlington, VT (US); Deborah A Laun, Syracuse, NY (US); David T. Middleton, Jr., Skaneateles, NY (US)

(73) Assignee: The Orvis Company, Inc., Sunderland, VT (US)

( * ) Notice: Subject to any disclaimer, the term of this patent is extended or adjusted under 35 U.S.C. 154(b) by 134 days.

(21) Appl. No.: 12/509,511

(22) Filed: Jul. 27, 2009

(65) Prior Publication Data

US 2011/0017862 A1    Jan. 27, 2011

(51) Int. Cl.
*B65H 75/14* (2006.01)
*B65H 75/18* (2006.01)

(52) U.S. Cl. .... 242/605; 242/613; 242/614; 242/118.41

(58) Field of Classification Search .................. 242/588, 242/600, 605, 613, 614, 118.4, 118.41, 129
See application file for complete search history.

(56) References Cited

U.S. PATENT DOCUMENTS

| | | | |
|---|---|---|---|
| 5,354,012 A | 10/1994 | Vincent | |
| 5,494,204 A * | 2/1996 | Wang | 225/25 |
| 5,738,297 A | 4/1998 | Bailey et al. | |
| 6,076,758 A * | 6/2000 | Kieves et al. | 242/400.1 |

OTHER PUBLICATIONS

Cabela's Fly Fishing 2009 Catalog, pp. 71-77.
Orvis Fly Fishing Summer 2009 Catalog, pp. 87-90.

* cited by examiner

*Primary Examiner* — William E Dondero
(74) *Attorney, Agent, or Firm* — Fay Sharpe LLP

(57) ABSTRACT

A tippet spool is self-orientating when displayed on pegs at retail. The tippet spool also has structures adapted to interlock adjacent tippet spools in a stack with one spool rotatable with respect to its neighbors. The tippet spool is self orientating because of an asymmetrical central opening with the center of mass of the tippet spool opposite the portion of the central opening furthest from the center of the spool.

17 Claims, 5 Drawing Sheets

STACKABLE TIPPET SPOOL

FIELD OF THE DISCLOSURE

The present disclosure pertains to a spool adapted to be axially connected to a like identical spool and particularly to a stackable spool used to retail, store and dispense tippet material for fishing.

BACKGROUND OF THE DISCLOSURE

Fishing, and particularly fly fishing, is enjoyed by many in the United States and throughout the world. Fly fishing is performed with a rod, a reel mounted upon the rod, a fly line assembly upon the reel and rod, and a fly attached to the end of the fly line assembly. The angler uses this structure to cast a fly. The angler attempts to place the fly where a fish will take it. The fly line assembly often comprises a quantity of backing line wound upon the reel which is attached to a fly line which is in turn attached to a leader, attached to a tippet. The tippet is tied to the fly. Often, when an angler is fishing, the angler will wish to tie on a new fly, change a fly or change the weight of the tippet material being used. Often, an angler will fish for an extended period of time using the same rod, reel, fly line and leader. The angler may change flies frequently and often needs to renew or change the tippet as well.

Because the fly and the tippet are frequently changed or renewed, anglers often carry numerous flies and several spools of tippet with them while fishing.

Tippet material is often sold to anglers at large sporting goods stores, smaller fly fishing shops, and other retail establishments. Tippet material is frequently sold on small spools containing about 30 meters of tippet material. Tippet material is available from a number of different sources in many, many different types and sizes. Thus, the material from which the tippet is constructed varies. Some tippet is fabricated from fluorocarbon polymers. Other tippet is fabricated from nylon polymers. Tippets are compounded to have different stiffnesses. Tippets have different surface characteristics affecting their ability to hold a knot. Tippets also come in different diameters. Diameter is usually expressed in two ways. The diameter of tippet is specified in thousandths of an inch and also in a conventional tippet scale with designations such as "4x" and "6x". Tippet also has a variety of tensile strength. Because several different tippets may be appropriate for fishing on a given day at a given location, retailers often display a large number of various tippets for purchase by anglers. One popular method of displaying tippets is upon pegs fixed to a wall. A retailer will frequently display many different types and sizes of tippets on individual peg for review and purchase by consumers.

As previously stated, anglers often carry more than one spool of tippet when fishing. Some anglers prefer to place individual spools of tippet in pockets in a vest. Other anglers prefer to stack several tippets of varying sizes or characteristics together for use while fishing.

Thus, it is desirable to package tippets on spools which are inexpensive but also easy for a retailer to sell and also easy for an angler to carry either in pockets or in a stack while allowing the easy dispensing of tippet in use.

SUMMARY OF THE DISCLOSURE

A stackable tippet spool comprises a plastic disk forming one side of the spool, a cylindrical drum extending from one side of the disk near its periphery, an annular flange extending from the drum remote from the disk, a central opening in the disk surrounding a disk axis, the central opening having a periphery with a portion of the periphery being further from the disk axis than the remainder of the periphery, the spool having a center of mass generally opposite said axis from said central opening remote portion and labeling aligned to be readable when the spool is orientated with the central opening remote portion at the top of the central opening.

Further in accordance with the disclosure, the stackable tippet spool has a central opening with a generally circular edge interrupted by a semicircular outwardly extending excursion at the top of the central opening.

Still further in accordance with the disclosure, the spool central opening is surrounded by a central opening edge wall extending from the disk, the edge wall being of generally uniform depth, and the spool further comprises a plurality of ribs extending from the central opening wall to the annular flange.

Yet further in accordance with the disclosure, the stackable tippet spool is provided with a plurality of ribs extending from spool disk on the side of the disk axis opposite the central wall excursion thereby forming a counterweight opposite the central wall excursion.

Still further in accordance with the disclosure, the spool disk is provided with a cylindrical lip extending axially from the periphery of the spool disk on the side opposite the cylindrical drum and a plurality of tabs extending radially inwardly from the lip; the inside diameter of the lip being slightly greater than the outside diameter of the annular flange of the tippet spool wherein identical spools may be stacked with the flange of one spool retained within the lip of an adjacent spool by the inwardly extending tabs on the lip of the adjacent spool.

It is an object of the present disclosure to provide a tippet spool which can be easily displayed upon pegs at retail with labels aligned for easy reading by action of the design of the spool.

It is yet another object of the present disclosure to provide a tippet spool which can be easily stacked and carried as a stack with adjacent spools held to one another rotatably or easily separated and carried in a pocket without elements likely to snag on clothing or the like.

It is another object of the present disclosure to provide a tippet spool capable of carrying tippet in a manner easily sold to consumers and used by consumers which is inexpensive to manufacture, easy to merchandise and easy to use.

Further objects and advantages of the disclosure will be apparent from the following detailed description of a preferred embodiment of the disclosure and from the accompanying drawings.

DETAILED DESCRIPTION

Figure 1:
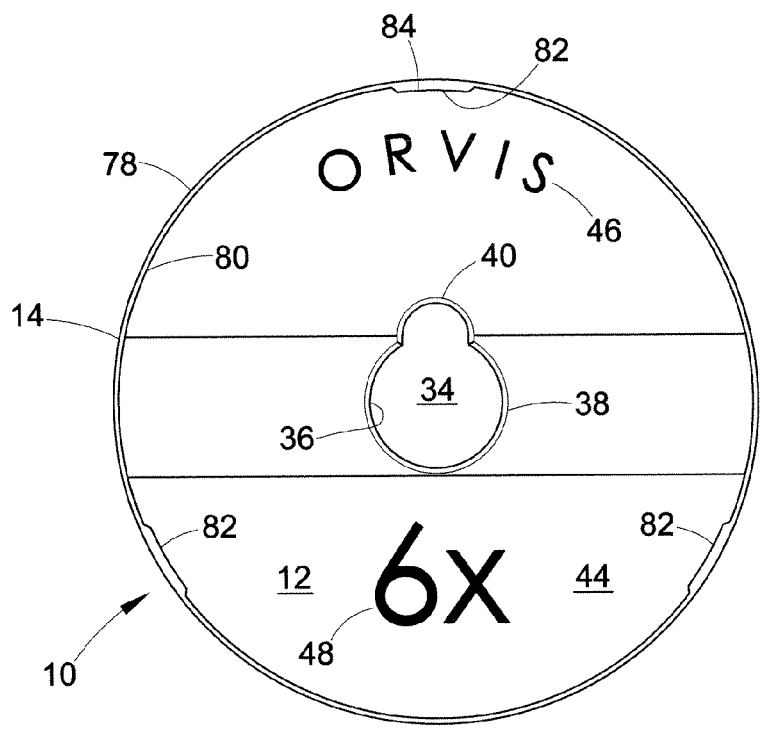
FIG. 1 is a front plan view of the tippet spool of the present disclosure.
Figure 3:
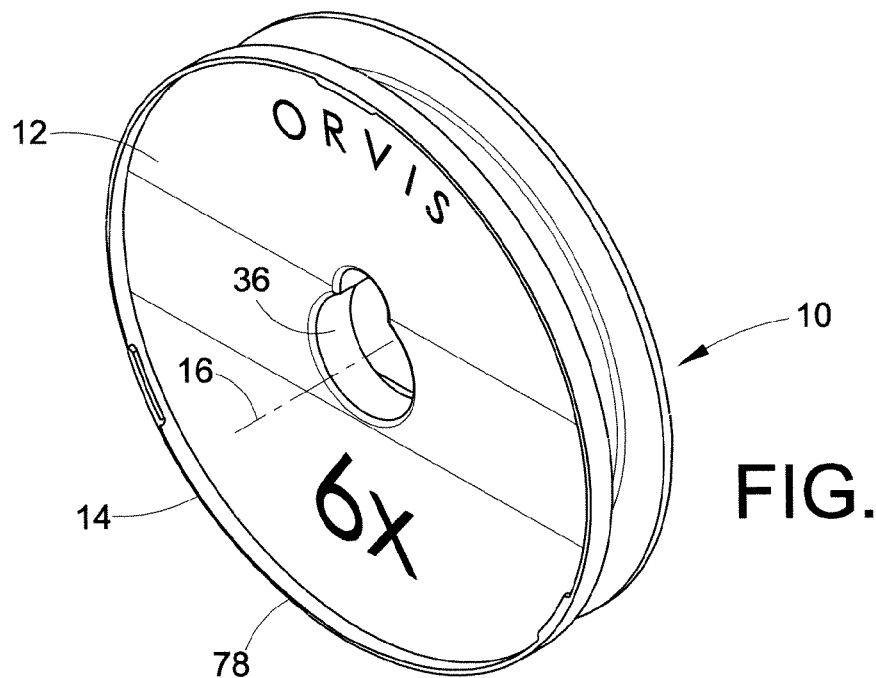
FIG. 3 is a perspective view of the tippet spool of FIGS. 1 and 2 from a top side front view.

Referring now to the drawings wherein the showings are for the purposes of illustrating a preferred embodiment of the disclosure only and not for the purposes of limiting same, the figures show a tippet spool 10 adapted to support a length of tippet (not shown). As seen in FIGS. 1 and 3, the tippet spool 10 has a front side 12 with a generally circular outer edge 14. The circular edge 14 is generally equally distant from an axis 16. Thus, the axis 16 is perpendicular to the front side 12 of the spool 10 at the center of the spool 10.

The tippet spool 10 is a unitary structure. In the preferred embodiment, the tippet spool 10 is molded from a polymeric material as a one-piece structure. Numerous appropriate polymeric materials are available for this purpose.

Figure 4:
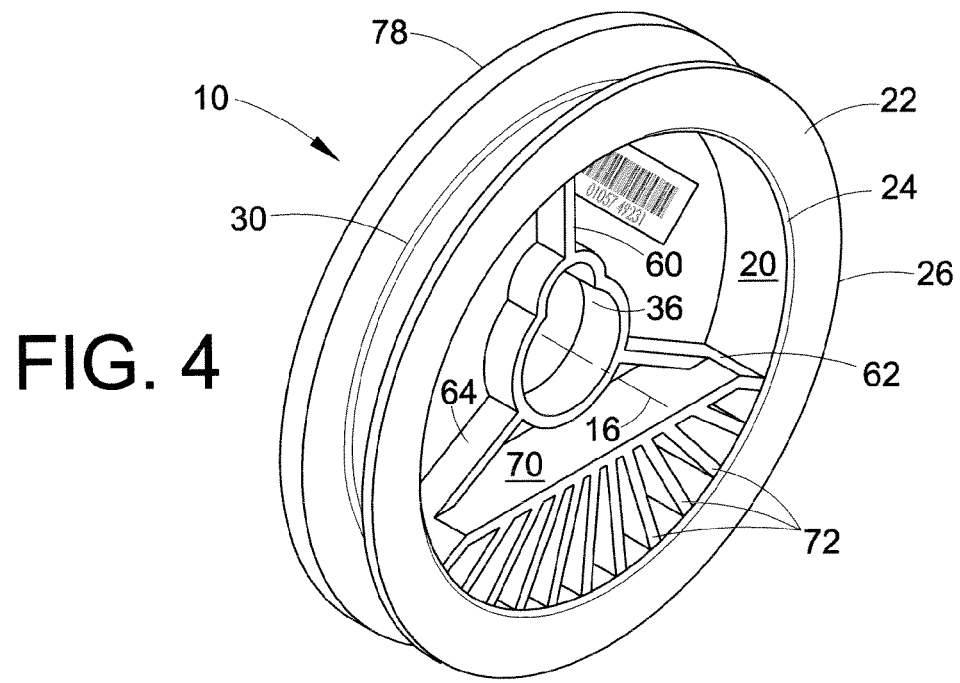
FIG. 4 is a perspective view of the tippet spool of FIGS. 1-3 from the rear top side.

Referring now to FIG. 4, the rear of the tippet spool 10 is illustrated. A cylindrical trough bottom 20 extends from the rear face of the front side disk 12. The trough bottom 20 is cylindrical and coaxial with the circular outer edge 14 of the front side disk 12. The trough bottom 20 is relatively close to the circular outer edge 14 of the front side disk 12 in the embodiment illustrated. However, the trough bottom 20 can be moved toward the axis 16 to accommodate more tippet material if desired. An annular flange 22 extends outwardly from the edge of the trough bottom 20 remote from the front side disk 12. The annular flange 22 has circular inner and outer edges 24, 26 centered on the axis 16. The diameter of the outer edge 26 of the trough 20 has a relationship with the circular outer edge 14 of the front side disk to be described hereinafter. The diameter of the outer edge 26 of the flange 22 is sufficiently similar to the outer edge of the front side disk 12 so that a circular trough 30 is defined by a portion of the front side disk 12, the trough bottom 20, and the flange 22. The trough 30 is adapted to retain and dispense a body of tippet material for use in fly fishing and the like. The trough 30 can be covered by an elastic band or otherwise to aid in holding and dispensing tippet as is conventional. The front side disk 12 or the flange outer edge 26 may have a narrow slit to retain the end of a length of tippet carried in the trough 30.

Referring again to FIGS. 1 and 3, the tippet spool 10 has a central aperture 34 surrounded by a central aperture side wall 36. The central aperture side wall 36 is integral with the front side disk 12 but also extends rearwardly well beyond the rear face of the front side disk 12. The central aperture side wall 36 includes a first portion 38 and a second portion 40. The first portion 38 is an incomplete circle centered on the axis 16 and open at its top. The second portion 40 is semicircular in shape with its ends connecting to the ends of the first portion 38. Thus, the second portion 40 of the central aperture wall 36 appears to be a semicircle centered on an axis spaced above the axis 16 of the first portion 38 and the tippet spool 10 itself. The central aperture side wall 36 does not need to have an appreciable depth (as shown). The central aperture may be an aperture in the disk 12 only, in which case the aperture side wall depth is the thickness of the disk 12 only.

Small products, such as tippets carried on tippet spools, are often displayed at retail on pegs which are fixed to vertical displays. Retailing pegs are available from many, many sources and used extensively in all sorts of retail shops. The pegs are often metal but can be plastic. The pegs frequently have a circular cross section, an up-turned end remote from the wall and sometimes a ball at this up-turned end to hold products on the peg until one of the products is affirmatively removed from the peg. One source sells standard wire pegboard hooks of 0.148 inch diameter with a slightly enlarged ball at the end of the hook remote from the display. A medium duty peg is fabricated from wire of 0.177 inches diameter and a heavy duty peg is fabricated from a wire having a diameter of 0.218 inches. The diameter of the semicircle forming the second portion of the central aperture side wall is selected to rest on these pegs. The diameter of the second portion can be less than the diameter of a ball at the end of a peg as the ball can be inserted through the first portion 38 of the central aperture side wall 36. However, this is not necessary as the design of the peg will retain the tippet spool on the peg until it is affirmatively removed.

Figure 2:
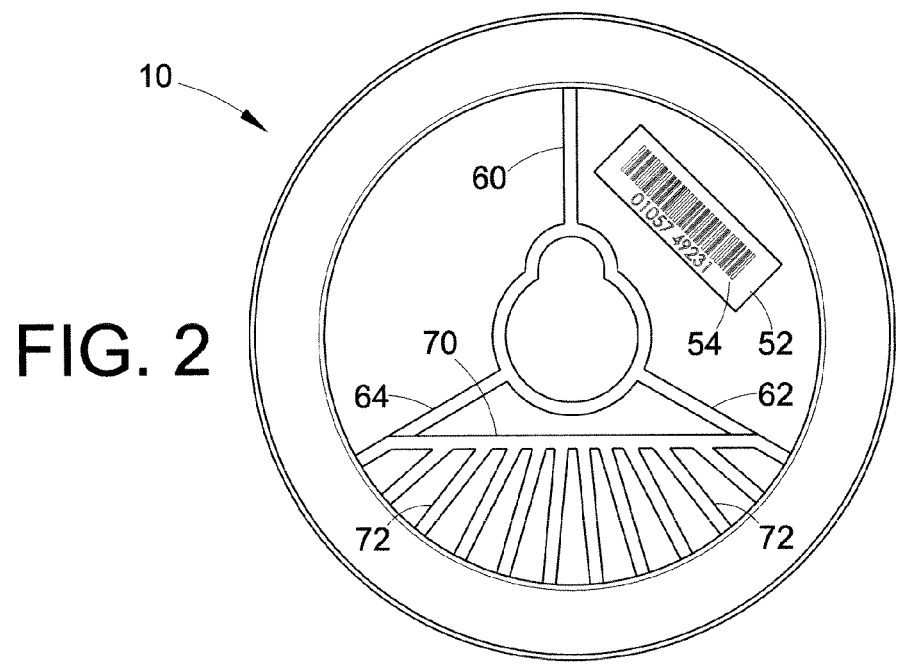
FIG. 2 is a back plan view of the tippet spool of FIG. 1.

Referring again to FIG. 1, a primary label 44 occupies almost all of the front surface of the tippet spool 10. The primary label 44 is normally a separately printed item applied to the tippet spool by adhesive or the like. However, the primary label 44 may be directly printed on the spool 10 if desired. The primary label 44 contains information important in marketing the product to the consumer including a trademark 46 and size information 48. Other information, such as quantity held, distributor name and information required by law or regulation is also presented on the primary label 44. The universal product code bar code is not presented on the primary label as it is not normally used by consumers in selecting a product. Rather, that piece of information is something important to retailers. As can be seen in FIG. 2, a supplemental label 52 is provided on the rear facing surface of the front side disk 12. The universal product code bar code 54 is presented on the supplemental label where it is available for inspection at checkout but does not occupy important consumer directed display space on the front side of the disk 12.

Figure 11:
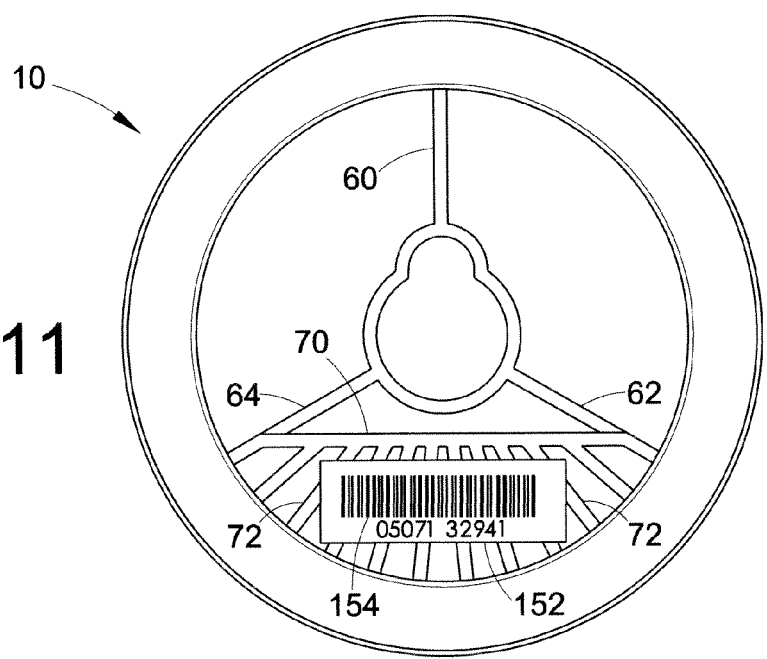

A second placement of a supplemental label 152 is seen in FIG. 11. The supplemental label 152 is adhered to the partial radial ribs 72. The rear surface of the ribs 72 is sufficient for adhesive to the spool by the supplemental label 152. The label 152 in FIG. 11 can be bigger than shown and extend onto the rear facing surface of the trough flange 30. The supplemental label 152 carries a UPC bar code 154.

The primary label 44 has a circular outer edge of the same size or slightly smaller than the circular outer edge 14 of the front side disk 12. The primary label 44 has a central aperture slightly larger than the central aperture 34 of the tippet spool 10. The primary label central aperture has the same shape as the tippet spool central aperture 34. Thus, the primary label 44 has only a single correct orientation with respect to the tippet spool which is dictated by registry of the central aperture of the primary label 44 upon the central aperture 34 of the tippet spool 10. Thus, the tippet spool 10 and the primary label 44 have "up" directions which are coincident with one another. This up direction is defined by placement of the second portion 40 of the central aperture 34 relative to the axis of the tippet spool.

Referring now to FIG. 2 and FIG. 4, a number of ribs extend from the rear facing surface of the front side disk 12. Three radial ribs 60, 62, 64 extend from the central aperture side wall 36 to the trough bottom 20. The first radial rib 60 extends straight upwardly from the point on the second portion 40 of the central aperture side wall 36 most remote from the axis 16. Thus, the first radial rib 60 extends in the "up" direction. The second radial rib 62 and third radial rib 64 are evenly spaced from the first radial rib 60 about 120° in each direction. Thus, three radial ribs are provided 120° apart around the axis 16 with the first radial rib 60 extending directly upwardly. The depth of the first radial rib 60, the depth of the central aperture side wall 36 and the depth of the most of the second and third radial ribs 62, 64 is uniform and less than the depth of the trough bottom 20. By depth is meant the distance a given rib or trough bottom extends from the rear face of the front side disk 12. This uniformity of depth is not necessary to the function of the spool nor is this particular depth necessary for operation of the tippet spool.

A lateral rib 70 extends between the second radial rib 62 and the third radial rib 64. The lateral rib 70 is straight and generally perpendicular to a line in the up/down direction passing through the axis of the spool 16. The depth of the lateral rib 70 is greater than the depth of the radial ribs 60, 62, 64 and almost as deep or equally as deep as the depth of the trough bottom 20. Those portions of the second radial rib 62 and third radial rib 64 outboard of the lateral rib 70 have a depth equal to the depth of the lateral rib 70. Ten partial radial ribs 72 are generally evenly spaced between the second radial rib 62 and the third radial rib 64. The partial radial ribs 72 extend from the lateral rib 70 to the trough bottom 20 and have a depth generally equal to the depth of the lateral rib 70. The lateral rib 70 and the partial radial ribs 72 provide mass in the tippet spool at its "down" portion. As previously discussed, the tippet spool 10 and its primary label 44 have an up direction dictated by the placement of the second portion of the central aperture side wall 36. The direction opposite up for the tippet spool is, of course, down. The lateral rib 70 and the partial ribs 72 are disposed on both sides of this down direction and provide mass at the down portion of the tippet spool. Thus, if a tippet spool 10 is placed upon a standard peg in virtually any orientation, the mass concentrated at the down portion of the tippet spool will cause rotation about the round peg, even if it bears against the first portion 38 of the central aperture side wall 36. The tippet spool 10 will rotate until its heaviest portion is at the bottom (down orientation) and the tippet spool will orientate with the second portion 40 of the central aperture 34 coming into engagement with the peg. The peg will enter into the second portion 40 of the central aperture 34 and proper orientation of the tippet spool 10 and the primary label 44 is provided. The tippet spool 10 and its primary label 44 is presented to consumers with marketing information properly orientated for easy reading.

The structure of a lateral rib 70 and partial ribs 72 is not the only way to achieve a proper weighting of the bottom or down portion of the tippet spool 10. The second radial rib 62 and third radial rib 64 could be made thicker and deeper than the first radial rib 60. If enough weight is added to these two ribs, the lateral rib and partial radial ribs 72 can be deleted. The trough bottom 20 can be thickened opposite the top of the tippet spool. The front side disk 12 can be thickened opposite the top of the tippet spool. Any structures adding mass to the bottom of the tippet spool will achieve this function. It is preferable to place additional mass near the edge 14 of the tippet spool 10 as it will exert a greater righting moment on the spool than a mass placed close to the axis 16.

Figure 10:
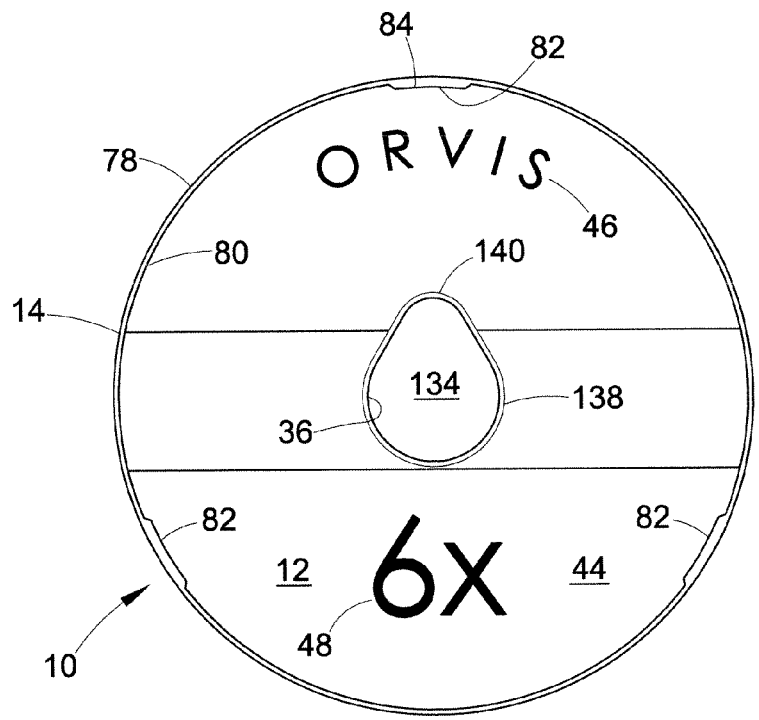
FIG. 10 shows a second embodiment of the invention in a view similar to FIG. 1; and, FIG. 11 shows the back of the spool of FIGS. 1-8 with an alternate bar code label attachment.

The central aperture side wall 36 does not have to have a first circular portion 38 and a second semi-circular portion 40 (a circle with a bite taken out of the top). Rather, an oval shape or another shape having a portion of the side wall 36 furthest away from the axis 16 at the top is all that is necessary. It is preferable that the aperture side wall 36 be smooth away from the top to facilitate rotation of the tippet spool 10 into the properly orientated disposition. An oval displaced upwardly from the axis 16 will serve this function. Other shapes will serve this function as well. For example, an alternate central aperture 124 is seen in FIG. 10. The central aperture side wall 136 has a first portion 138 which is an incomplete circle. The two ends of the incomplete circle extend upwardly. The side wall second part 140 comprises two inwardly sloping straight side portions joined by a top curve, completing the side wall 136. The top of the second portion 140 extends further from the axis 16 than other portions of the side wall 136. The top curve of the side wall second section will align to the top or upward direction when the spool is mounted on a page.

Figure 8:
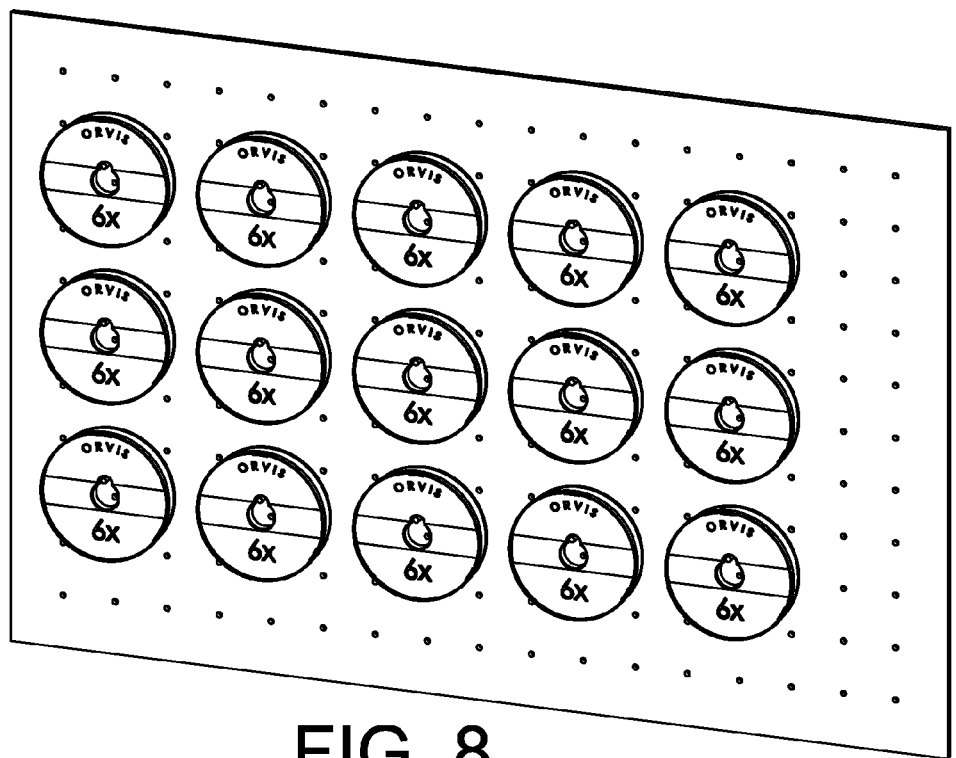
FIG. 8 shows a multiplicity of the spools of FIGS. 1-7 as displayed on pegs such as would be done at retail.
Figure 9:
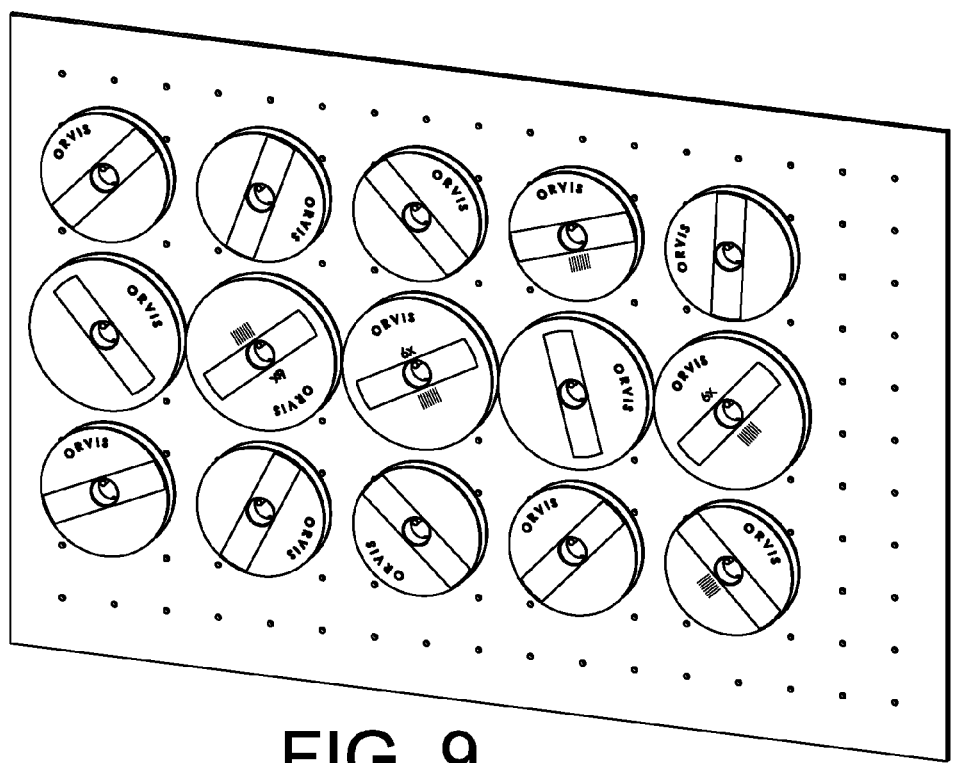
FIG. 9 shows prior art spools in a display similar to that seen in FIG. 8.

Referring to FIGS. 8 and 9, the contrast between presentation of tippet spools in accordance with the present invention (FIG. 8) and presentation of tippet spools in accordance with the prior art (FIG. 9) is seen. Prior art tippet spools were not self-orientating. When placed upon a peg board, as seen in FIG. 9, the tippet spools would be presented in a somewhat random orientation. Even if a retailer orientates the spools, they will likely become disorganized as customers inspect them. Potential purchasers might know that they were tippet spools from their overall appearance but would have to either orientate the tippet spool on the peg, or remove the tippet spool from the peg to easily read information such as tippet size, tippet material and particular application. Thus, many tippet spools carry the following information: a primary trademark identifying the brand; an indication as to whether the tippet is to be used in fresh water or salt water; the length of tippet material provided on the spool; the test strength, that is the tensile strength of the tippet material in pounds and kilograms; the diameter of the tippet material in conventional X measurement, such as "5X", in inches such as "0.006" and a diameter in millimeters such as 0.15 millimeters; and, the material from which the tippet is fabricated such as "fluorocarbon" or "nylon". The country of orgin, the name of the distributor, the universal product code bar code, and other, promotional information is also frequently presented. A typical tippet spool is less than 2.5 inches in diameter and has central aperture. The above described information is an enormous amount of information to fit into such a small area. This results in cramped presentations and small type sizes. Couple this with a non-ideal orientation and the tippet spool label becomes difficult to read.

Compared with this, the tippet spool of the present invention is self-orientating. Moreover, one particularly large piece of information, the UPC bar code, is moved off of the primary label 44. A much more easily read package is presented. It becomes easy for the consumer to differentiate one size or type of tippet on the spools from another size or type of tippet. Less mistakes are made and consumer satisfaction increased.

Referring again to FIG. 3, a circumferential ridge 78 extends forwardly from the circular outer edge of the front side disk 12. The circumferential ridge 78 is cylindrical and centered on the axis 16 of the tippet spool 10. The circumferential ridge 78 has a cylindrical inner surface 80 which is also centered on the spool axis 16. Several, in the preferred embodiment 3, shallow tabs 82 extend inwardly from the edge of the circumferential ridge 78 remote from the front side disk 12.

Figure 5:
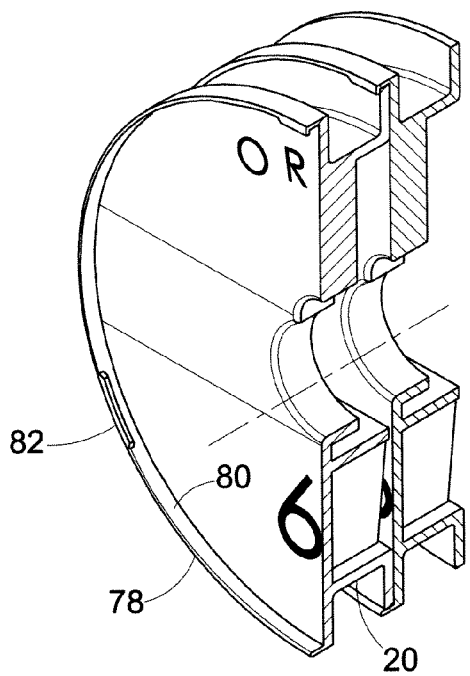
FIG. 5 shows two of the tippet spools as shown in FIGS. 1-4 nested one in the other in a perspective view with one half of the spools cut away along a vertical line.
Figure 6:
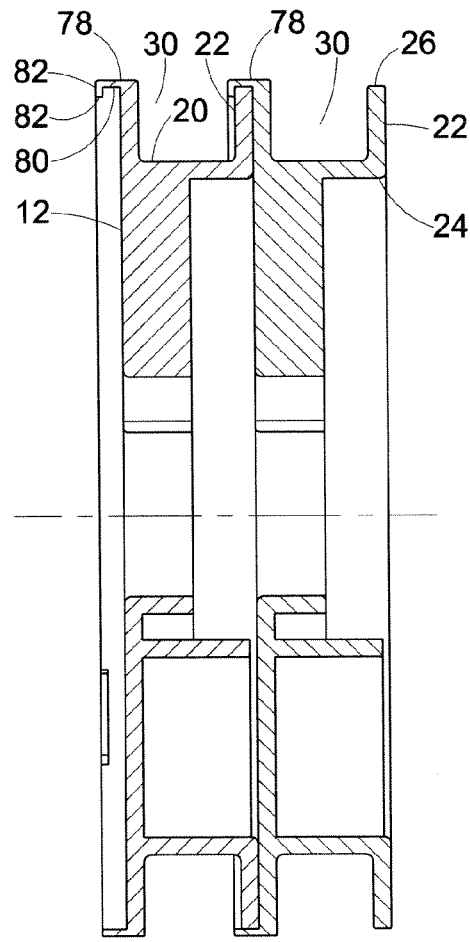
FIG. 6 shows the spools of FIG. 5 in vertical cross section.
Figure 7:
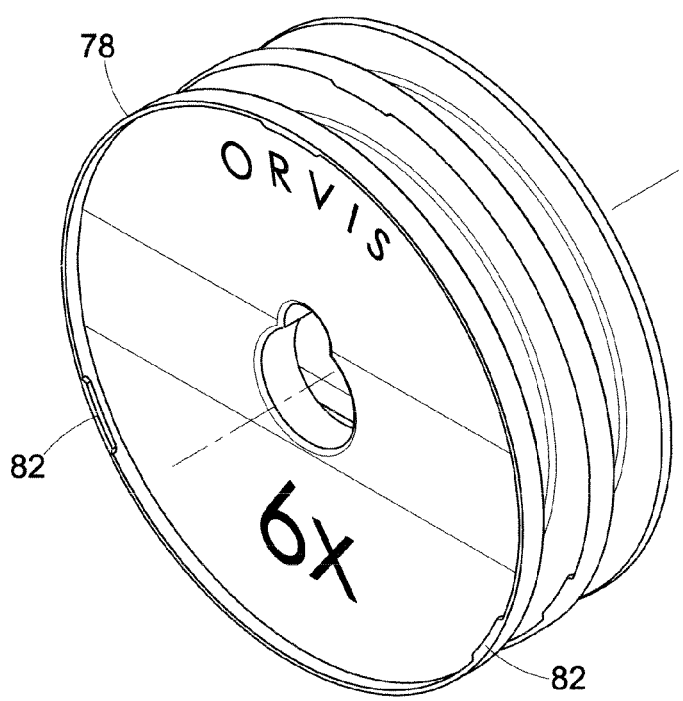
FIG. 7 shows two spools nested together in a perspective similar to that of FIG. 3.

Referring now to FIGS. 5 and 6, the annular flange 22 outer edge 26 is slightly smaller in diameter than the ridge 18 inner surface 80. The inner edges 84 of the tabs 82 lie along a circle having a diameter slightly smaller than the diameter of the flange outer edge 26. These relationships allow two identical tippet spools 10 to be snapped together as seen in FIGS. 5, 6 and 7 with the annular flange 22 of one tippet spool 10 lying adjacent the front side disk 12 of an adjacent tippet spool 10. The annular flange 22 is held adjacent the front side disk 12 as the flange outer edge 26 is contained within the ridge inner surface 80 preventing lateral movement. The two tippet spools 10 are prevented from moving axially from one another as the tabs 82 engage the flange 22 on the side opposite the front side disk 12.

The tippet spool 20 is fabricated from a polymer material with some resiliency. The tabs 82 are shallow in depth. Because of this, tippet spools 10 can be snapped together and pulled apart easily and repeatedly by a user. However, in normal conditions, the tippet spools will not fall apart from one another because of the engagement of the tabs 82 over the annular flange 22.

The engagement between adjacent tippet spools is rotational. That is, one can rotate one tippet spool with respect to a second engaged tippet spool without disengaging them. Moreover, the depth of the trough 30 can be varied without changing the other dimensions of the tippet spool. Thus, a tippet spool carrying a very heavy tippet material or a heavy leader construction material can have the same central aperture dimension and the same outer edge dimension thus providing inter engagement with other similar tippet spools and also providing the self-orientating feature described above. A spool with a non-circular outer edge can be made in accordance with the disclosure. Such a spool would later lock with other similar spools in a non-rotational manner.

The tippet spool 10 is designed with appropriate drafts and relief to accommodate injection molding or other manufacturing techniques.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fishing tippet spool comprising:
   a circular trough adapted to contain a length of tippet, said trough being generally symmetrical about a first spool axis, said trough surrounding a central volume adjacent said first spool axis;
      an opening within said central volume, said opening surrounded by an opening wall, said opening wall being asymmetrical about said first axis, said opening wall including at least one first portion at a first distance from said first spool axis and at least one second portion at a second distance from said first spool axis, said first distance being greater than said second distance, said first portion being a top outwardly extending portion extending from said first spool axis in a direction defined as a spool top;
      a label having a top and information presented on said label, said information more easily read when said label top is orientated in an upward direction;
      said tippet spool having a surface supporting said label with said label top orientated with said spool top;
      said tippet spool having a center of mass; and,
      said center of mass being more distant from said spool top than said first spool axis.

2. The fishing tippet spool of claim 1 wherein said opening wall second portion is a portion of a circle centered on said first spool axis, said portion of a circle leaving two ends.

3. The fishing tippet spool of claim 2 wherein said opening wall first portion extends outwardly between said two ends of said portion of a circle.

4. The fishing tippet spool of claim 3 wherein said opening wall first portion is an arc bowing outwardly between said two ends of said portion of a circle.

5. The fishing tippet spool of claim 4 wherein said arc is a semicircle.

6. The fishing tippet spool of claim 5 wherein said semicircle has a diameter slightly greater than the diameter of the display peg upon which it is to be displayed.

7. The fishing tippet spool of claim 3 wherein said spool has more mass on the side of said first spool axis opposite said spool top than on the side of said first spool axis adjacent said spool top.

8. The fishing tippet spool of claim 7 wherein said spool has a plurality of ribs adjacent said trough, said ribs being on the side of said first spool axis opposite said spool top.

9. The fishing tippet spool of claim 1 wherein said surface supporting said label is a flat disk.

10. The fishing tippet spool of claim 9 wherein said flat disk has a front face supporting said label and a periphery, at least a portion of said disk being adjacent said trough;
    a circumferential ridge extending from the front face of said disk at the disk periphery, said circumferential ridge having an edge remote from said disk;
    a plurality of shallow tabs extending axially inwardly from the edge of said circumferential ridge remote from said disk;
    said trough having a trough bottom and a flange adjacent said trough on the side of said trough opposite said disk, said flange having an outer edge, said flange outer edge adapted to be received within a circumferential ridge of a similar tippet spool and retained by said tabs, whereby similar tippet spools may be releasably held together.

11. The fishing tippet spool of claim 10 wherein said flange edge is circular.

12. A fishing tippet spool comprising
    a spool axis;
    an annular trough adapted to contain a length of tippet, said trough being generally symmetrical about said spool axis;
    a spool front side disk having a central aperture, a periphery, a front face and a rear face, at least a portion of said front side disk being adjacent said trough with said rear face facing said trough;
    a circumferential ridge extending from the front face of said disk at the disk periphery, said circumferential ridge having an edge remote from said front side disk;
    a plurality of shallow tabs extending radially inwardly from the edge of said circumferential ridge remote from said front side disk,
    a trough bottom,
    a flange adjacent said trough on the side of said trough opposite said front side disk, said flange having an outer edge, said flange outer edge adapted to be received within a circumferential ridge of a similar tippet spool and retained by said tabs, whereby similar tippet spools are adapted to be releasably and rotatably held together.

13. The fishing tippet spool of claim 12 wherein said plurality of shallow tabs comprise at least three tabs.

14. The fishing tippet spool of claim 13 wherein said tabs are regularly spaced around the circumferential ridge.

15. A fishing tippet spool comprising
    a spool axis;
    an annular trough adapter to contain a length of tipper, said trough being generally symmetrical about said spool axis;
    a spool front side disk having a central aperture, a periphery, a front face and a rear face, at least a portion of said front side disk being adjacent said trough with said rear face facing said trough;

a circumferential ridge extending from the front face of said disk at the disk periphery, said circumferential ridge having an edge remote from said front side disk;

a plurality of shallow tabs extending radially inwardly from the edge of said circumferential ridge remote from said front side disk, a trough bottom, a flange adjacent said trough on the side of said trough opposite said front side disk, said flange having an outer edge, said flange outer edge adapted to be received within a circumferential ridge of a similar tippet spool and retained by said tabs, whereby similar tippet spools are adapted to be releasably and rotatably held together, said front side disk further comprising a center, a top and information presented on the front face of said disk, said information most easily read when said spool is orientated with said disk top uppermost; said tippet spool having a center of mass on the side of said disk center opposite said disk top.

16. The fishing tippet spool of claim 15 wherein said disk central aperture has an edge, said edge being generally equidistant from said disk center except in the direction of sad disk top where said aperture edge is more distant from said disk center than for the remaining portions of said aperture edge.

17. The fishing tippet spool of claim 16 wherein said aperture edge is generally circular and centered at said disk center except for a portion in the direction of said disk top where said aperture edge is further from said disk center.

* * * * *